(12) United States Patent
Miyaji et al.

(10) Patent No.: US 7,650,422 B2
(45) Date of Patent: Jan. 19, 2010

(54) AUDIO PLAYBACK APPARATUS FOR CONTROLLING PAUSE AND RESUME OF AUDIO

(75) Inventors: Satoshi Miyaji, Saitama (JP); Yasuhiro Takishima, Saitama (JP)

(73) Assignee: KDDI Corporation, Tokyo (JP)

( * ) Notice: Subject to any disclaimer, the term of this patent is extended or adjusted under 35 U.S.C. 154(b) by 717 days.

(21) Appl. No.: 11/247,271

(22) Filed: Oct. 12, 2005

(65) Prior Publication Data
US 2006/0104314 A1 May 18, 2006

(30) Foreign Application Priority Data
Oct. 15, 2004 (JP) ............................. 2004-301611

(51) Int. Cl.
*G06F 15/16* (2006.01)
(52) U.S. Cl. .................... 709/231; 709/203; 379/88.17
(58) Field of Classification Search ............. 379/88.17; 370/352–356; 709/203
See application file for complete search history.

(56) References Cited

U.S. PATENT DOCUMENTS 6,092,128 A * 7/2000 Maas et al. .................. 710/57
6,665,751 B1 * 12/2003 Chen et al. .................. 710/52
6,715,126 B1 * 3/2004 Chang et al. ................ 715/201
6,996,624 B1 * 2/2006 LeCroy et al. .............. 709/231
2004/0098264 A1 * 5/2004 Bowater et al. ............. 704/270

FOREIGN PATENT DOCUMENTS

WO  WO 01/01614 A1  1/2001

* cited by examiner

*Primary Examiner*—Simon Sing
(74) *Attorney, Agent, or Firm*—Oblon, Spivak, McClelland, Maier & Neustadt, L.L.P.

(57) ABSTRACT

An audio playback apparatus includes a playback section for playing audio back, a buffer section (13) for temporarily storing voice data to be played back, a switch (14) for on/off switching transmission of the voice data from the buffer section (13) to the playback section, at least one threshold judgment section (18) for judging whether an amount of voice data buffered in the buffer section (13) is equal to or smaller than at least one threshold value, the at least one threshold judgment section (18) providing a true output when the buffered voice data amount is equal to or smaller than the at least one threshold value, a timer (19) triggered by an output from the at least one threshold judgment section to output a trigger pulse with a predetermined duration of time, and a first control section (191) for controlling on/off of the switch (14) to prevent transmission of the voice data in the buffer section (13) to the playback section for the predetermined duration of time of the trigger pulse when the true output is provided from the at least one threshold judgment section (18).

15 Claims, 3 Drawing Sheets

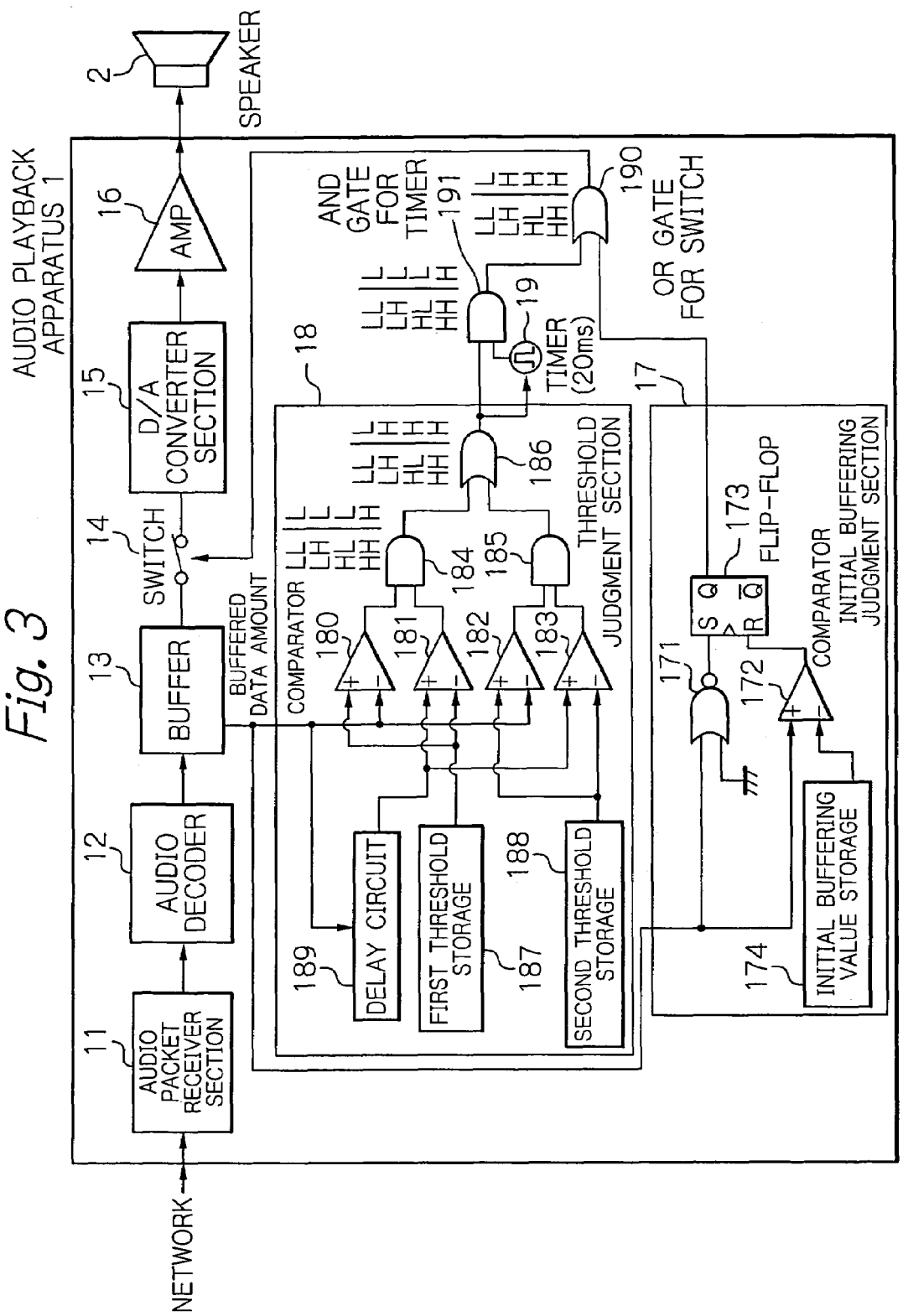

AUDIO PLAYBACK APPARATUS FOR CONTROLLING PAUSE AND RESUME OF AUDIO

PRIORITY CLAIM

This application claims priority from Japanese patent application No.2004-301611, filed on Oct. 15, 2004, which is incorporated herein by reference.

BACKGROUND OF THE INVENTION

1. Field of the Invention

The present invention relates to an audio playback apparatus and method for controlling pause and resume of audio. Particularly, the present invention relates to an audio playback apparatus used for conversation in an IP (Internet Protocol) phone and in an IP video telephony.

2. Description of the Related Art

FIG. 1 illustrates a functional configuration of a preceded digital audio playback apparatus that is not known in public.

The preceded digital audio playback apparatus 1 shown in FIG. 1 is configured to receive packets containing compressed audio data and play back audio in the packets. This apparatus 1 has an audio packet receiver section 11, an audio decoder 12, a buffer 13, a switch 14, a D/A converter section 15, an amplifier 16 and an initial buffering judgment section 17.

The audio packet receiver section 11 receives packets containing compressed audio data from the network, and transmits the compressed audio data to the audio decoder 12. The audio decoder 12 decodes the compressed audio data into non-compressed PCM (pulse code modulation) data and outputs the PCM data to the buffer 13. The buffer 13 temporarily stores the PCM data and outputs them to the D/A converter section 15 through the switch 14. The initial buffering judgment section 17 monitors the amount of data stored or buffered in the buffer 13 and controls based upon the buffered data amount on/off of the switch 14. The D/A converter section 15 converts the PCM data input through the switch 14 into an analog signal and outputs the converted analog signal to the amplifier 16. The analog audio signal output from the amplifier 16 is provided to the speaker 2 to play back the audio.

The initial buffering judgment section 17 is provided with a NOR gate 171, a comparator 172, an RS flip-flop 173 and an initial buffering value storage 174. The NOR gate 171 outputs an "H" level signal to the flip-flop 173 when the buffered data amount becomes zero. The comparator 172 compares the buffered data amount in the buffer 13 with an initial buffering value and outputs a "H" level signal to the flip-flop 173 when the buffered data amount becomes equal to or higher than the initial buffering value stored in the storage 174. The flip-flop 173 controls turning on/off of the switch 14 depending upon whether it is set or reset.

Hereinafter, operation of this audio playback apparatus will be described.

Under initial conditions, no PCM data is stored in the buffer 13. Therefore, "0" is input to the NOR gate 171 and thus its output becomes "H" level signal. As a result, the flip-flop 173 is set to turn the switch 14 off, so that PCM data output from the audio decoder 12 are stored in the buffer 13 without being output to the D/A converter section 15.

When the buffered amount of the PCM data in the buffer 13 becomes equal to or higher than the initial buffering value, the comparator 172 outputs an "H" level signal. Thus, the flip-flop 173 is reset and the switch 14 turns on, so that the PCM data stored in the buffer 13 is provided to the D/A converter section 15 and that the analog audio signal is provided to the speaker 2 through the amplifier 16 to play the audio back.

In such audio playback apparatus where packets containing audio data are received and audio in the packets is played back while receiving another packets, if receiving timings of the packets vary due to changes in the transmission rate through the network, it may occur that no packet can be received for a time period longer than the time equivalent to the buffered amount. In such case, all the buffered data may be extracted from the buffer to fall into an underflow state.

When the buffered amount of the PCM data in the buffer 13 becomes zero or underflows, the output of the NOR gate 171 becomes the "H" level signal, the flip-flop 173 is set and thus the switch 14 turns off. Thus, the PCM data output from the audio decoder 12 are not fed to the D/A converter section 15 but stored in the buffer 13. Then, when the buffered amount of the PCM data in the buffer 13 becomes equal to or higher than the initial buffering value, the switch 14 turns on.

During a period where the switch 14 is off state, playback of audio is paused and therefore break or interruption of voice occurs. This operation of the buffer during the off state of the switch is called as a re-buffering operation.

If the audio packets arrive without delay, the buffered amount of the data will not lower than the initial buffering value. However if delay in arrival of the audio packets occurs, the buffered level goes downward. If the delay continues, it will cause underflow. Thus break or interruption of voice will occur due to the re-buffering operation. Then when the delay in arrival of the audio packets is over and the delayed packets arrive at a time, the buffered data amount will abruptly increase.

The initial buffering operation and the re-buffering operation should be carried out for a somewhat long time so that the buffering data amount never underflows again. In case of real time applications such as Voice over IP (VoIP) or IP video telephony, it is necessary to perform the re-buffering operation for a period of one hundred milliseconds to several hundreds milliseconds in consideration of tradeoff between the resiliency against delay variation. Whereas in case of non-real time applications such as video streaming, a period of the re-buffering operation is in general set to several seconds in order to give a particular importance to stability.

However, in case of applications for voice communication such as VoIP or IP video telephony, break or interruption of voice for a period longer than one hundred milliseconds will be clearly recognized and deteriorate quality of audio communications. Therefore, in order to improve the audio quality in the audio playback system for receiving packets containing audio data and playing audio in the packets back, it will be necessary to shorten the period of break or interruption of voice due to the re-buffering.

As for known technique of voice buffering in voice information communication, International Publication No. WO 01/01614 A1 discloses a system for changing the delay on a communication link by adjusting relative positions of read and write pointers of a buffer during silent periods. However, this known technique cannot shorten the period of break or interruption of voice due to the re-buffering.

SUMMARY OF THE INVENTION

It is therefore an object of the present invention to provide an audio playback apparatus, whereby a period of break or interruption of voice due to the re-buffering can be effectively shortened.

According to the present invention, an audio playback apparatus includes a playback section for playing audio back, a buffer section for temporarily storing voice data to be played back, a switch for on/off switching transmission of the voice data from the buffer section to the playback section, at least one threshold judgment section for judging whether an amount of voice data buffered in the buffer section is equal to or smaller than at least one threshold value, the at least one threshold judgment section providing a true output when the buffered voice data amount is equal to or smaller than the at least one threshold value, a timer triggered by an output from the at least one threshold judgment section to output a trigger pulse with a predetermined duration of time, and a first control section for controlling on/off of the switch to prevent transmission of the voice data in the buffer section to the playback section for the predetermined duration of time of the trigger pulse when the true output is provided from the at least one threshold judgment section.

It is preferred that the at least one threshold judgment section includes a threshold judgment section, storing a threshold value, for judging whether an old buffered data amount that represents the amount of the buffered data predetermined period earlier is larger than the threshold value, and the threshold value is larger than a buffered data amount at the present time.

It is also preferred that the at least one threshold judgment section includes a plurality of threshold judgment section for judging whether the buffered voice data amount is equal to or smaller than the respective threshold values, each of the plurality of threshold judgment section providing a true output when the buffered voice data amount is equal to or smaller than the threshold value, and that the at least one threshold judgment section provides a true output when the true output is provided from any one of the plurality of threshold judgment section.

It is further preferred that the at least one threshold value includes an initial buffering value required for audio playback at initial stage.

It is preferred that the trigger pulse from the timer has a duration corresponding to one frame in audio coding.

It is also preferred that the at least one threshold judgment section provides a true output of a "H" level when the buffered voice data amount is equal to or smaller than the at least one threshold value, and a false output of a "L" level when the buffered voice data amount is larger than the at least one threshold value, that the timer provides a "H" level output with a predetermined duration of time, and that the first control section includes an AND gate receiving the "H" level or "L" level output from the at least one threshold judgment section and the "H" level output from the timer, an output from the AND gate controlling on/off of the switch.

It is preferred that the at least one threshold judgment section provides a true output of a "H" level when the buffered voice data amount is equal to or smaller than the at least one threshold value, and a false output of a "L" level when the buffered voice data amount is larger than the at least one threshold value, that the timer provides a "H" level output with a predetermined duration of time, that the first control section includes an AND gate receiving the "H" level or "L" level output from the at least one threshold judgment section and the "H" level output from the timer, and that the apparatus further includes an initial buffering judgment section for monitoring the buffered voice data amount and providing a "H" level output when the buffered voice data amount is equal to or smaller than an initial buffering value, and a second control section having an OR gate receiving an output from the first control section and an output from the initial buffering judgment section, an output from the OR gate controlling on/off of the switch.

According to the present invention, also, an audio playback method executed by a computer includes a step of temporarily storing voice data to be played back into a buffer section, a step of on/off switching transmission of the voice data from the buffer section for playing audio back, a step of judging whether an amount of voice data stored in the buffer section is equal to or smaller than at least one threshold value to provide a true output when the buffered voice data amount is equal to or smaller than the at least one threshold value, a step of outputting a trigger pulse with a predetermined duration of time in response to the provided output, and a step of controlling the on/off switching step to prevent transmission of the voice data in the buffer section for the predetermined duration of time of the trigger pulse when the true output is provided.

It is preferred that the judging step includes a step of storing a threshold value, and a step of judging whether an old buffered data amount that represents the amount of the buffered data predetermined period earlier is larger than the threshold value, and the threshold value is larger than a buffered data amount at the present time.

It is also preferred that the judging step includes a plurality of steps of judging whether the buffered voice data amount is equal to or smaller than a plurality of threshold values, each providing a true output when the buffered voice data amount is equal to or smaller than the threshold value, and a step of providing a true output when the true output is provided from any one of the plurality of steps of judging.

It is further preferred that the at least one threshold value includes an initial buffering value required for audio playback at initial stage.

It is preferred that the trigger pulse has a duration corresponding to one frame in audio coding.

It is also preferred that the judging step includes a step of providing a true output of a "H" level when the buffered voice data amount is equal to or smaller than the at least one threshold value, and a false output of a "L" level when the buffered voice data amount is larger than the at least one threshold value, that the outputting step includes a step of providing a "H" level trigger pulse with a predetermined duration of time, and that the controlling step includes a step of calculating logical AND of the "H" level or "L" level output provided by the judging step and the "H" level trigger pulse, a calculated logical AND output being used in the on/off controlling step.

It is further preferred that the judging step includes a step of providing a true output of a "H" level when the buffered voice data amount is equal to or smaller than the at least one threshold value, and a false output of a "L" level when the buffered voice data amount is larger than the at least one threshold value, that the outputting step includes a step of providing a "H" level trigger pulse with a predetermined duration of time, that the controlling step includes a step of calculating logical AND of the "H" level or "L" level output provided by the judging step and the "H" level trigger pulse, and that the method further includes a step of monitoring the buffered voice data amount, a step of providing an initial buffering judged "H" level output when the buffered voice data amount is equal to or smaller than an initial buffering value, and a step of calculating logical OR of the calculated logical AND output and the initial buffering judged "H" level output, a calculated logical OR output being used in the on/off controlling step.

According to the present invention, extremely short breaks or interruptions of voice that are not audible as interruptions are intentionally inserted so as to keep the buffered data amount near the initial buffering value, which avoids falling into the underflow state. Also, because the interruption period of voice is extremely short, no disruption in conversation will occur. During the interruption period of voice, no voice data is extracted from the buffer and therefore it is expected that the buffered data amount increase over the threshold value. Therefore, a frequency of re-buffering at the underflow state of the buffer can be extremely reduced and thus quality of conversation will be maintained even if there are packet delay variations on the network.

Further objects and advantages of the present invention will be apparent from the following description of the preferred embodiments of the invention as illustrated in the accompanying drawings.

BRIEF DESCRIPTION OF THE DRAWINGS

FIG. 3 is a block diagram illustrating a functional configuration of a digital audio playback apparatus in another embodiment according to the present invention.

DESCRIPTION OF THE PREFERRED EMBODIMENTS

Figure 2:
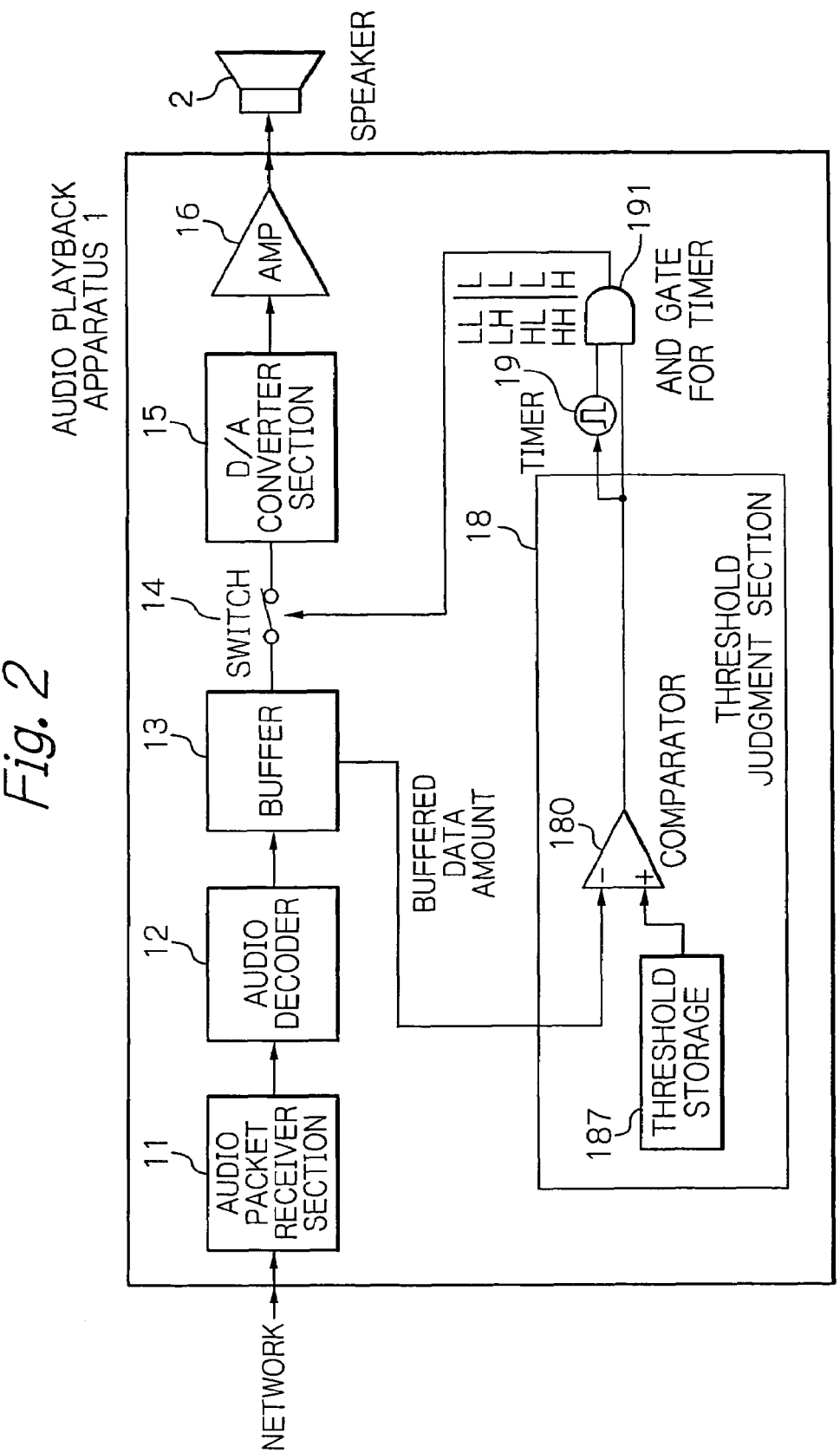
FIG. 2 is a block diagram illustrating a functional configuration of a digital audio playback apparatus in a preferred embodiment according to the present invention.

FIG. 2 illustrates a functional configuration of a digital audio playback apparatus in a preferred embodiment according to the present invention. The functional configuration of the audio playback apparatus may be implemented by a digital computer with a program.

The digital audio playback apparatus 1 shown in FIG. 2 is configured to receive packets containing compressed audio data and play back audio in the packets. This apparatus 1 has an audio packet receiver section 11, an audio decoder 12, a buffer 13, a switch 14, a D/A converter section 15, an amplifier 16, a threshold judgment section 18, a timer 19 and an AND gate 191 for the timer.

The audio packet receiver section 11 receives packets containing compressed audio data from the network, and transmits the compressed audio data to the audio decoder 12. The audio decoder 12 decodes the compressed audio data into non-compressed PCM (pulse code modulation) data and outputs the PCM data to the buffer 13. The buffer 13 temporarily stores the PCM data and outputs them to the D/A converter section 15 through the switch 14. The D/A converter section 15 converts the PCM data input through the switch 14 into an analog signal and outputs the converted analog signal to the amplifier 16. The analog audio signal output from the amplifier 16 is provided to the speaker 2 to play back the audio.

The threshold judgment section 18 is provided with a threshold storage 187 for storing a threshold value and a comparator 180. The comparator 180 compares the buffered data amount in the buffer 13 with the threshold value and outputs a "H" level signal that represents "true" when the buffered data amount becomes equal to or lower than the threshold value for example, otherwise outputs a "L" level signal that represents "false". The timer 19 repeatedly outputs 20 millisecond-pulsive signal that corresponds to one typical audio encoding frame when the input signal level is "H", which is coming from the comparator 180 shown in FIG. 2. The AND gate 191 receives a judgment signal ("H" level signal/"L" level signal) from the threshold judged section 18 and the trigger pulse signal ("H" level signal/"L" level signal) from the timer 19. This AND gate 191 outputs a "H" level signal only when both the input signals are "H" level and outputs a "L" level signal otherwise. The switch 14 turns off in response to the "H" level signal, and turns on in response to the "L" level signal.

Hereinafter, operation of this audio playback apparatus will be described.

Under initial conditions, no PCM data is stored in the buffer 13. Therefore, the buffered data amount is lower than the threshold value and the comparator 180 outputs a "true" or "H" level signal. Thus, the timer 19 outputs the "H" level trigger pulse signal with duration of 20 milliseconds, and therefore the AND gate 191 outputs an "H" level signal for 20 milliseconds. As a result, the switch 14 turns off in response to the "H" level signal and keeps off state for a very short period of 20 milliseconds of the "H" level signal. During the off-state of the switch 14, PCM data output from the audio decoder 12 are stored in the buffer 13 without being output to the D/A converter section 15. In 20 milliseconds, the trigger pulse signal from the timer 19 turns to "L" level and thus output from the AND gate 191 changes into "L" level to turn on the switch 14 for 20 milliseconds. When the switch 14 turns on and keeps on-state, the PCM data stored in the buffer 13 is provided to the D/A converter section 15 and that the analog audio signal is provided to the speaker 2 through the amplifier 16 to play the audio back. After another 20 milliseconds, the pulse signal from the timer 19 turns to "H" level to turn off the switch 14 again. Thus, the switch 14 periodically turns on and off in every 20 milliseconds until the buffer level exceeds the threshold.

Thus, initially, break or interruption of voice may occur. However, because this interruption period of voice is very short as 20 milliseconds, it will be heard as a momentary noise and therefore no disruption in conversation will occur. During the interruption period of voice, no PCM data is extracted from the buffer 13 and therefore it is expected that the buffered data amount increase over the threshold value.

If the buffered data amount becomes equal to or higher than the threshold value, the comparator 180 outputs a "false" or "L" level signal. In this case, the AND gate 191 always outputs an "L" level signal irrespective of the output level of the timer 19. As a result, the switch 14 keeps on state and therefore the PCM data stored in the buffer 13 is provided to the D/A converter section 15 so that the analog audio signal is provided to the speaker 2 through the amplifier 16 to play the audio back.

Thereafter, if the buffered data lowers than the threshold value due to delay in the arrival of packets from the network that causes decrease of the level of the buffer 13, the comparator 180 outputs a "true" or "H" level signal. Thus, the timer 19 outputs the "H" level trigger pulse signal with duration of 20 milliseconds, and therefore the AND gate 191 outputs an "H" level signal for 20 milliseconds. As a result, the switch 14 turns off in response to the "H" level signal and keeps off state for a very short period of 20 milliseconds of the "H" level signal. During the off-state of the switch 14, PCM data output from the audio decoder 12 are stored in the buffer 13 without being output to the D/A converter section 15. In 20 milliseconds, the trigger pulse signal from the timer 19 turns to "L" level and thus output from the AND gate 191 changes into "L" level to turn on the switch 14. When the switch 14 turns on and keeps on-state, the PCM data stored in the buffer 13 is provided to the D/A converter section 15 and the analog audio signal is provided to the speaker 2 through the amplifier 16 to resume playback of audio.

In this case, as similar to the initial state, break or interruption of voice may occur. However, because the interruption period of voice is extremely short as 20 milliseconds, it will not be audible as interruption but will be heard as a momentary noise, and therefore no disruption in conversation will occur. During the interruption period of voice, no PCM data is extracted from the buffer 13 and therefore it is expected that the buffered data amount increase over the threshold value. That is, once the buffered data amount lowers than the threshold value that will be larger than zero, turning off of the switch 14 occurs and the buffered data amount starts to increase. Therefore, a frequency of re-buffering at the underflow state of the buffer can be extremely reduced and thus quality of conversation will be maintained even if there are packet delay variations on the network.

FIG. 3 illustrates a functional configuration of a digital audio playback apparatus in another embodiment according to the present invention. The functional configuration of the audio playback apparatus may be implemented by a digital computer with a program.

Figure 1:
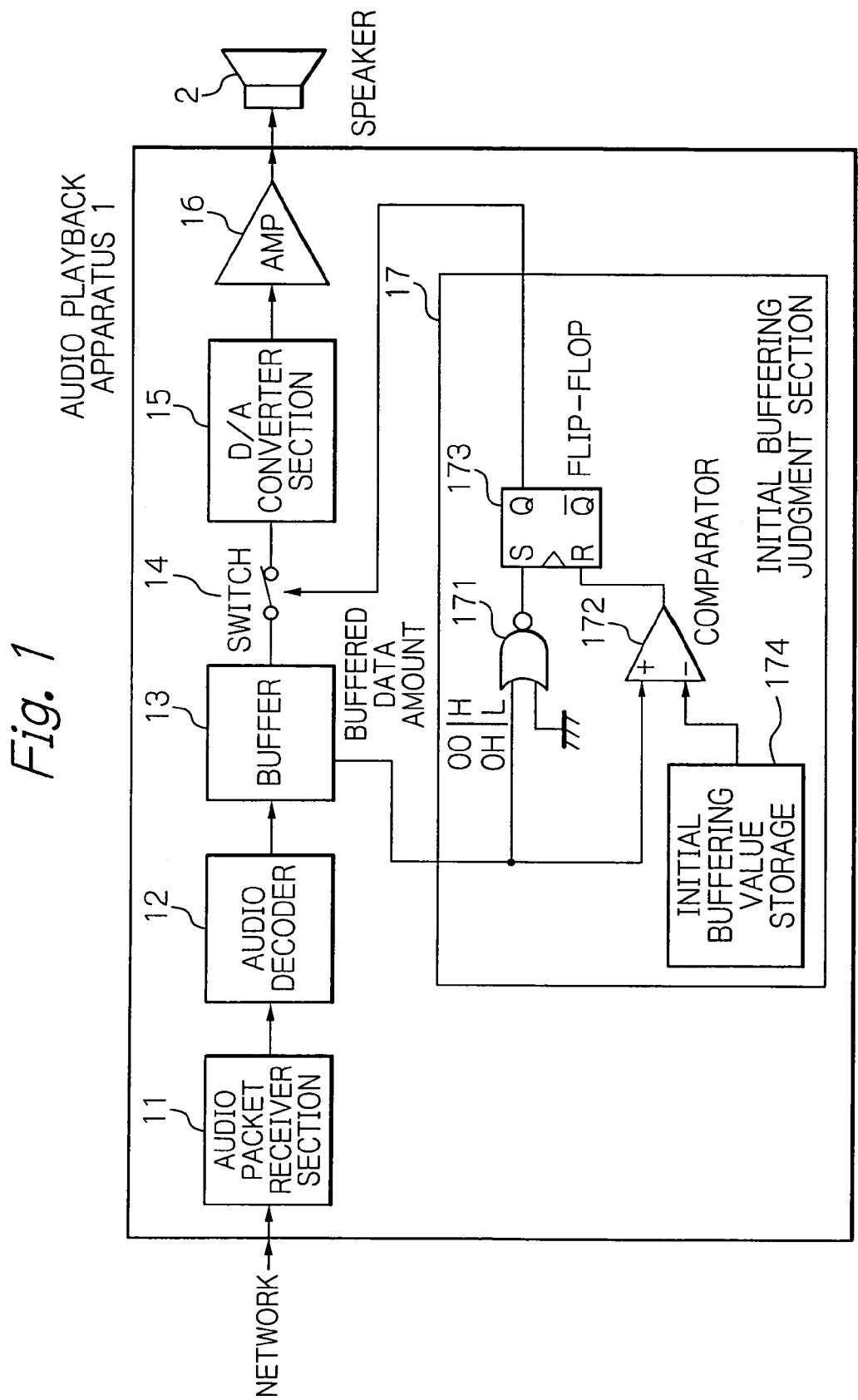
FIG. 1 already described is a block diagram illustrating a functional configuration of a preceded digital audio playback apparatus.

The audio playback apparatus shown in FIG. 3 differs from that shown in FIG. 2 in the following points. In the apparatus of FIG. 3, an initial buffering judgment section 17 and an OR gate 190 for the switch are additionally provided. Also, in the apparatus of FIG. 3, the threshold judgment section 18 has a plurality of comparators. Thus, judgment of the underflow state can be implemented as the audio playback apparatus shown in FIG. 1. Furthermore, because a plurality of threshold values are stepwise provided down to the underflow state, the number of breaks or interruptions of voice can be controlled depending upon the buffered data amount.

As shown in FIG. 3, the threshold judgment section 18 has four comparators 180-183, AND gates 184 and 185, an OR gate 186, first and second threshold storages 187 and 188, and a delay circuit 189. The delay circuit 189 can provide an old buffered data amount that represents the amount of the buffered data predetermined period earlier (buffered data amount at the past time). If it is designed that the duration of break or interruption of voice, that is, the duration of trigger pulse signal from the timer 19 is 20 milliseconds, the delay time may be determined about 30 milliseconds. The first and second threshold storages 187 and 188 store different first and second threshold values as threshold values of the buffered data amount in previous stage down to the underflow state. The first threshold value may be equal to or smaller than the initial buffering value, and the second threshold value may be equal to one-half the first threshold value or one-half the initial buffering value.

In case of one-way distribution of voice data in which a large delay in end-to-end communication is allowed, a large value of the initial buffering value will be selected so that change in delay in network communication can be absorbed. However, in case of communication for conversation such as VoIP or IP video telephony, required is a small delay and thus a large initial buffering value is not allowed in such communication so that the communication has to execute under insufficient buffered data amount.

In this embodiment, two threshold values are prepared and therefore two pairs of comparators 180 and 181, and 1812 and 183 are provided in the threshold judgment section 18. The number of pairs of comparators is not limited to two as this embodiment but optionally determined to any number corresponding to the number of the threshold values.

The comparator 180 judges whether the old buffered data amount or the buffered data amount at the past time is larger than the first threshold value, the comparator 181 judges whether the first threshold value is larger than the buffered data amount at the present time, the comparator 182 judges whether the buffered data amount at the past time is larger than the second threshold value, and the comparator 183 judges whether the second threshold value is larger than the buffered data amount at the present time.

The AND gate 184 outputs a "H" level signal only when both the comparators 180 and 181 output "true" or "H" level signals, and the AND gate 185 outputs a "H" level signal only when both the comparators 182 and 183 output "true" or "H" level signals. Thus, the AND gate 184 outputs the "H" level signal only when the buffered data amount lowers through the first threshold value during the predetermined period from the past time to the present time. Also, the AND gate 185 outputs the "H" level signal only when the buffered data amount lowers through the second threshold value during the predetermined period from the past time to the present time.

The OR gate 186 outputs an "H" level signal when the output from the AND gate 184 or 185 becomes "H" level. This "H" level signal from the OR gate 186 or the threshold judgment section 18 is provided to the timer 19 to trigger it and is directly applied to the AND gate 191 for timer. The timer 19 repeatedly outputs 20 millisecond-pulsive signal that corresponds to one typical audio encoding frame when the input signal level is "H", which is coming from the comparator 180 shown in FIG. 2. The AND gate 191 receives the judgment signal from the threshold judged section 18 and the trigger pulse signal from the timer 19. This AND gate 191 outputs a "H" level signal only when both the input signals are "H" level and outputs a "L" level signal otherwise to the OR gate 190 for switch.

The initial buffering judgment section 17 has a NOR gate 171, a comparator 172, an RS flip-flop 173 and an initial buffering value storage 174. The NOR gate 171 outputs an "H" level signal to the flip-flop 173 when the buffered data amount becomes zero. The comparator 172 compares the buffered data amount in the buffer 13 with an initial buffering value and outputs a "H" level signal to the flip-flop 173 when the buffered data amount becomes equal to or higher than the initial buffering value stored in the storage 174. Thus, the flip-flop 173 outputs an "H" level signal when the buffered data amount is under the underflow state and increases up to the initial buffering value. Whereas, the flip-flop 173 outputs a "L" level signal when the buffered data amount is equal to or larger than the initial buffering value and when the buffered data amount decreases down to zero but not equal to zero.

The OR gate 190 receives both the output from the threshold judgment section 18 and the output from the initial buffering judgment section 17. Therefore, this OR gate 190 outputs a "H" level signal when the initial buffering judgment section 17 judges that the buffered data amount increases from zero but not reaches the initial buffering value yet. This OR gate 190 also outputs a "H" level signal for 20 milliseconds when the buffered data amount lowers through the first or second threshold value during the predetermined period from the past time to the present time. The switch 14 turns off in response to the "H" level signal to pause the output of the audio data from the buffer 13 to the D/A converter section 15.

According to this embodiment, extremely short breaks or interruptions of voice that are not audible as interruptions are intentionally inserted so as to keep the buffered data amount near the initial buffering value, which avoids falling into the underflow state. Also, because the interruption period of voice is extremely short as 20 milliseconds, no trouble for conversation will occur. During the interruption period of voice, no PCM data is extracted from the buffer 13 and therefore it is expected that the buffered data amount increase over the threshold value. Therefore, a frequency of re-buffering at the underflow state of the buffer can be extremely reduced and thus quality of conversation will be maintained even if there are packet delay variations on the network.

Hereinafter, a concrete example of buffered data amount control will be described.

Suppose, for example, output data from the voice decoder 12 has parameters of 8000 Hz sampling frequency, 16 bit quantization, and a monophonic channel. In this case, if the initial delay is 100 milliseconds (0.1 seconds), the initial buffering value for starting playback becomes 1600 bytes from the equation of:

1600 bytes=8000 Hz×16 bits/8 bits×0.1 seconds.

If the input rate to and the output rate from the buffer 13 are equal to each other, the buffered data amount will stay near the initial buffering value (1600 bytes). However, if delay in arrival of the voice data occurs, the buffered data amount will decrease. Contrary to this, if the delay is resolved and the delayed data are arrived at once, the buffered data amount will abruptly increase.

In case of the initial buffering value of 1600 bytes, two threshold values, namely a first threshold value of 1200 bytes and a second threshold value of 800 bytes may be used. In modifications, buffered data amount control with three threshold values, in which a third threshold value of 400 bytes for an additional pair of comparators is used may be executed.

The buffered data amount B(t) in normal state is expressed as:

$$B(t)=Bin(t)-Bout(t-t_0)$$

where Bin(t) is a total amount of data input into the buffer until a time t, Bout(t) is a total amount of data output from the buffer for a time period t, which is represented as in case of voice data Bout(t)=8000 Hz×16 bits/8 bits×t, and $t_0$ is a time period of the initial buffering during which the playback of audio is paused.

After the communication, when the buffered data amount kept near 1600 bytes decreases down to the first threshold value of 1200 bytes or less due to the delay in receive of packets, an extremely short break in voice for 20 milliseconds is intentionally produced. For this 20 milliseconds, extraction of the voice data from the buffer is paused and thus the buffered data amount increases, in other words decrease in the buffered data amount is prevented. The buffered data amount B(t) at this time is expressed as B(t)=Bin(t)−Bout(t−0.1 seconds−0.02 seconds).

When the buffered data amount still decreases down to the second threshold value of 800 bytes or less due to further delay in receive of packets, an extremely short break in voice for 20 milliseconds is further intentionally produced. For this 20 milliseconds, extraction of the voice data from the buffer is paused and thus the buffered data amount increases, in other words decrease in the buffered data amount is prevented. The buffered data amount B(t) at this time is expressed as B(t)=Bin(t)−Bout(t−0.1 seconds−0.02 seconds−0.02 seconds).

In the aforementioned embodiments, turning off/on the switch controls pause and resume of audio playback. However, according to the present invention, pause and resume of audio playback can be controlled by any method for temporarily preventing extraction of the data from the buffer, such as for example a method for stopping the conversion operation of the D/A converter section.

Many widely different embodiments of the present invention may be constructed without departing from the spirit and scope of the present invention. It should be understood that the present invention is not limited to the specific embodiments described in the specification, except as defined in the appended claims.

The invention claimed is:

1. An audio playback apparatus comprising:
  a playback means for playing audio back;
  a buffer means for temporarily storing-voice data to be played back;
  a switch for on/off switching transmission of the voice data from said buffer means to said playback means;
  at least one threshold judgment means for judging whether an amount of voice data buffered in said buffer means is equal to or smaller than at least one threshold value, said at least one threshold judgment means providing a true output when the buffered voice data amount is equal to or smaller than said at least one threshold value;
  a timer triggered by the true output from said at least one threshold judgment means to output a trigger pulse, which is part of a pulse train which alternates between a first value of the trigger pulse and a second value, each of the first value and second value having a predetermined duration of time, said pulse train being output when the at least one threshold judgment means provides the true output; and
  a first control means for controlling on/off of said switch to prevent transmission of the voice data in said buffer means to said playback means for the predetermined duration of time of said trigger pulse when the true output is provided from said at least one threshold judgment means.

2. The audio playback apparatus as claimed in claim 1, wherein said at least one threshold judgment means includes a threshold judgment means, storing a threshold value, for judging whether an old buffered data amount that represents the amount of the buffered data predetermined period earlier is larger than said threshold value, and said threshold value is larger than a buffered data amount at the present time.

3. The audio playback apparatus as claimed in claim 1, wherein said at least one threshold judgment means includes a plurality of threshold judgment means for judging whether the buffered voice data amount is equal to or smaller than the respective threshold values, each of said plurality of threshold judgment means providing a true output when the buffered voice data amount is equal to or smaller than the threshold value, and wherein said at least one threshold judgment means provides a true output when the true output is provided from any one of said plurality of threshold judgment means.

4. The audio playback apparatus as claimed in claim 1, wherein said at least one threshold value includes an initial buffering value required for audio playback at initial stage.

5. The audio playback apparatus as claimed in claim 1, wherein the trigger pulse from said timer has a duration corresponding to one frame in audio coding.

6. The audio playback apparatus as claimed in claim 1, wherein said at least one threshold judgment means provides a true output of a "H" level when the buffered voice data amount is equal to or smaller than said at least one threshold value, and a false output of a "U" level when the buffered voice data amount is larger than said at least one threshold value, wherein said timer provides a "H" level output with a predetermined duration of time, and wherein said first control means includes an AND gate receiving the "H" level or "L" level output from said at least one threshold judgment means and the "H" level output from said timer, an output from said AND gate controlling on/off of said switch.

7. The audio playback apparatus as claimed in claim 1, wherein said at least one threshold judgment means provides a true output of a "H" level when the buffered voice data amount is equal to or smaller than said at least one threshold value, and a false output of a "L" level when the buffered voice data amount is larger than said at least one threshold value, wherein said timer provides a "H" level output with a predetermined duration of time, wherein said first control means includes an AND gate receiving the "H" level or "L" level output from said at least one threshold judgment means and the "H" level output from said timer, and wherein said apparatus further comprises an initial buffering judgment means for monitoring the buffered voice data amount and providing a "H" level output when the buffered voice data amount is equal to or smaller than an initial buffering value, and a second control means having an OR gate receiving an output from said first control means and an output from said initial buffering judgment means, an output from said OR gate controlling on/off of said switch.

8. An audio playback method executed by a computer comprising the steps of:
  temporarily storing voice data to be played back into a buffer means;
  on/off switching transmission of the voice data from said buffer means for playing audio back;
  judging whether an amount of voice data stored in said buffer means is equal to or smaller than at least one threshold value to provide a true output when the buffered voice data amount is equal to or smaller than said at least one threshold value;
  outputting a trigger pulse in response to the provided true output, said trigger pulse being part of a pulse train which alternates between a first value of the trigger pulse and a second value, each of the first value and second value having a predetermined duration of time, said pulse train being output when the true output is provided in the judging step; and
  controlling the on/off switching step to prevent transmission of the voice data in said buffer means for the predetermined duration of time of said trigger pulse when the true output is provided.

9. The audio playback method as claimed in claim 8, wherein the judging step includes a step of storing a threshold value, and a step of judging whether an old buffered data amount that represents the amount of the buffered data predetermined period earlier is larger than said threshold value, and said threshold value is larger than a buffered data amount at the present time.

10. The audio playback method as claimed in claim 8, wherein the judging step includes a plurality of steps of judging whether the buffered voice data amount is equal to or smaller than a plurality of threshold values, each providing a true output when the buffered voice data amount is equal to or smaller than the threshold value, and a step of providing a true output when the true output is provided from any one of the plurality of steps of judging.

11. The audio playback method as claimed in claim 8, wherein said at least one threshold value includes an initial buffering value required for audio playback at initial stage.

12. The audio playback method as claimed in claim 8, wherein said trigger pulse has a duration corresponding to one frame in audio coding.

13. The audio playback method as claimed in claim 8, wherein the judging step includes a step of providing a true output of a "H" level when the buffered voice data amount is equal to or smaller than said at least one threshold value, and a false output of a "L" level when the buffered voice data amount is larger than said at least one threshold value, wherein the outputting step includes a step of providing a "H" level trigger pulse with a predetermined duration of time, and wherein the controlling step includes a step of calculating logical AND of the "H" level or "L" level output provided by the judging step and the "H" level trigger pulse, a calculated logical AND output being used in the on/off controlling step.

14. The audio playback method as claimed in claim 8, wherein the judging step includes a step of providing a true output of a "H" level when the buffered voice data amount is equal to or smaller than said at least one threshold value, and a false output of a "L" level when the buffered voice data amount is larger than said at least one threshold value, wherein the outputting step includes a step of providing a "H" level trigger pulse with a predetermined duration of time, wherein the controlling step includes a step of calculating logical AND of the "H" level or "L" level output provided by the judging step and the "H" level trigger pulse, and wherein said method further comprises a step of monitoring the buffered voice data amount, a step of providing an initial buffering judged "H" level output when the buffered voice data amount is equal to or smaller than an initial buffering value, and a step of calculating logical OR of the calculated logical AND output and the initial buffering judged "H" level output, a calculated logical OR output being used in the on/off controlling step.

15. An audio playback apparatus comprising:
  a playback means for playing audio back;
  a buffer means for temporarily storing-voice data to be played back;
  a switch for on/off switching transmission of the voice data from said buffer means to said playback means;
  at least one threshold judgment means for judging whether an amount of voice data buffered in said buffer means is equal to or smaller than at least one threshold value, said at least one threshold judgment means providing a true output when the buffered voice data amount is equal to or smaller than said at least one threshold value;
  a timer triggered by the true output from said at least one threshold judgment means to output a trigger pulse with a predetermined duration of time which corresponds to one frame in audio coding; and
  a first control means for controlling on/off of said switch to prevent transmission of the voice data in said buffer means to said playback means for the predetermined duration of time of said trigger pulse when the true output is provided from said at least one threshold judgment means.

* * * * *